(12) United States Patent
Warzelhan et al.

(10) Patent No.: US 10,237,535 B2
(45) Date of Patent: Mar. 19, 2019

(54) METHOD FOR GENERATING A DEPTH MAP USING A CAMERA

(71) Applicant: Robert Bosch GmbH, Stuttgart (DE)

(72) Inventors: Jan Karl Warzelhan, Pittsburgh, PA (US); Merlin Goettlinger, Nürnberg (DE)

(73) Assignee: Robert Bosch GmbH, Stuttgart (DE)

( * ) Notice: Subject to any disclaimer, the term of this patent is extended or adjusted under 35 U.S.C. 154(b) by 107 days.

(21) Appl. No.: 15/384,556

(22) Filed: Dec. 20, 2016

(65) Prior Publication Data
US 2017/0188018 A1 Jun. 29, 2017

(30) Foreign Application Priority Data

Dec. 23, 2015 (DE) .......... 10 2015 226 667
Jan. 20, 2016 (DE) .......... 10 2016 200 660

(51) Int. Cl.
*H04N 13/02* (2006.01)
*H04N 13/271* (2018.01)
*H04N 13/204* (2018.01)
*H04N 5/232* (2006.01)
*G01B 11/02* (2006.01)
(Continued)

(52) U.S. Cl.
CPC ......... *H04N 13/271* (2018.05); *G01B 11/026* (2013.01); *G06T 7/571* (2017.01); *H04N 5/232* (2013.01); *H04N 13/204* (2018.05); *G06T 2207/10148* (2013.01); *H04N 2013/0081* (2013.01)

(58) Field of Classification Search
CPC .... H04N 13/271; H04N 13/204; H04N 5/232; H04N 2013/0081; G01B 11/026; G06T 7/571; G06T 2207/10148

USPC .......................................................... 348/50
See application file for complete search history.

(56) References Cited

U.S. PATENT DOCUMENTS

2009/0167923 A1* 7/2009 Safaee-Rad ........ H04N 5/23212
348/345
2014/0099001 A1* 4/2014 Nepomniachtchi .. G06K 9/3275
382/112
(Continued)

FOREIGN PATENT DOCUMENTS

DE 102013223995 5/2015

OTHER PUBLICATIONS

<Rishnan et al., "Range Estimation From Focus Using a Non-Frontal Imaging Camera", International Journal of Computer Vision, Kluwer Academic Publishers, Norwell, US, Bd. 20, Nr. 3, Dec. 1996, pp. 169-185.
(Continued)

*Primary Examiner* — Jared Walker
(74) *Attorney, Agent, or Firm* — Michael Best & Friedrich LLP

(57) ABSTRACT

A method for generating a depth map of at least one selected region (210) of a capturing region (200) of a camera (100), wherein the camera (100) is aimed at a plurality of mutually different partial regions (220, 221, 222) of the at least one selected region (210), wherein for each of the partial regions (220, 221, 222) a depth information item is ascertained from the respective partial region (220, 221, 222) by varying a focus setting of the camera (100), and wherein the depth map (400) is generated taking into account the depth information of the partial regions (220, 221, 222), and to such a camera (100).

10 Claims, 3 Drawing Sheets

(51) Int. Cl.
G06T 7/571 (2017.01)
H04N 13/00 (2018.01)

(56) References Cited

U.S. PATENT DOCUMENTS

| | | | | |
|---|---|---|---|---|
| 2014/0160294 A1* | 6/2014 | Naylor | ............ | G08B 13/19606 |
| | | | | 348/155 |
| 2015/0104050 A1* | 4/2015 | Harrison | ................ | G06T 7/004 |
| | | | | 381/303 |
| 2015/0109468 A1* | 4/2015 | Laroia | .................... | G02B 13/02 |
| | | | | 348/208.6 |
| 2015/0294473 A1* | 10/2015 | Michot | ................... | G06T 5/005 |
| | | | | 382/154 |

OTHER PUBLICATIONS

Gaspar et al., "New Depth From Focus Filters in Active Monocular Vision Systems for Indoor 3-D Tracking", IEEE Transactions on Control Systems Technology, Bd. 23, Nr. 5, Sep. 2015, pp. 1827-1839.

Ikeoka et al. "Depth Estimation Using Smart Image Sensor with Multiple-Focus Image Function", Journal of the Institute of Image Information and Television Engineers, Mar. 2008, pp. 384-391.

Wan et al. "Multiresolution and Wide-Scope Depth Estimation Using a Dual- PTZ-Camera System", IEEE Transactions on Image Processing, IEEE Service Center, Piscataway, NJ, US, Bd. 17, Nr. 3, Mar. 2009, pp. 677-682.

* cited by examiner

METHOD FOR GENERATING A DEPTH MAP USING A CAMERA

BACKGROUND OF THE INVENTION

The present invention relates to a method for generating a depth map of at least one selected region of a capturing region of a camera, and to a camera, a computing unit and a computer program for performing it.

Monitoring cameras are used for detecting suspicious objects or people, for counting people or for automatic monitoring of a specific region within the capturing region of the camera. In particular, sterile zones such as for example fences, external areas of buildings and the like are monitored. The field of use of such monitoring cameras, however, increasingly extends to public access regions, such as for example supermarkets, train stations, airports and the like.

In order to ensure robust tracking of objects in such scenes, the monitoring cameras can be calibrated. Typically suitable here is a calibration which calculates a relationship between 2-D image points and 3-D image points, the positions of which are located in the associated base plane. This information can be used to estimate real speeds and object sizes, for example in order to be able to calculate more stable object tracking in the camera image.

Depth information which extends beyond this, such as for example of objects located in the scene (for example obstacles, ramps, stairs, cabinets, objects placed on the ground, and the like), generally cannot be extracted easily with what is known as a single-camera system, i.e. a fixedly mounted monocular camera, as is typical for the field of video monitoring. However, this information is additionally useful in order to be able to develop further improvement and thus more robust systems with video content analysis (VCA).

In addition to static cameras, what are known as PTZ cameras can also be used in video monitoring, with PTZ being an acronym for pan, tilt and zoom. Such cameras may be fitted at one location so as to be stationary, while their camera system (optical system with an image sensor) is movable. This permits observation of different regions of a monitoring scene and thus gives a more flexible video monitoring option of the scene to be monitored.

DE 10 2013 223 995 A1 discloses for example a monitoring camera with which a depth map, i.e. a map with depth information (i.e. distance of an image point from a reference point, in particular from the camera), of a capturing region of the camera can be ascertained. Here, the camera is moved in space in order to be able to capture the capturing region from various observation angles, from which the depth map is then generated.

SUMMARY OF THE INVENTION

A method according to the invention serves for generating a depth map of at least one selected region of a capturing region of a camera. The capturing region can here be a maximum region which is capturable or can be seen by the camera, maybe by panning the camera or the like, or the scene to be monitored. The at least one selected region may indeed be the entire capturing region, but it is practical to select only specific regions for which monitoring is desired from the entire capturing region. It may for example be practical to select only one such region in which people can actually move. In the proposed method, the camera is now aimed at a plurality of mutually different partial regions of the at least one selected region. Aiming at a partial region is here understood to mean limiting the current region of the camera which is within the field of view of the camera to a specific partial region to be captured. Aiming at specific partial regions can be effected for example by using the opening angle and current observation angle of the camera which are known for a used camera generally as part of controlling it. The partial regions are also frequently referred to in image processing as what are known as tiles. For each of the partial regions, a depth information item is ascertained from the respective partial region by varying a focus setting of the camera, wherein the depth map is then generated taking into account the depth information for the partial regions.

It is now possible with the method proposed to generate a very accurate depth map, i.e. a map having depth information of the capturing region of the camera or at least of a selected region thereof. The proposed method here uses the fact that ascertaining a depth information item by varying the focus settings of the camera works significantly better for small sections of a capturing region than for the entire capturing region, since in a small section, as opposed to the entire capturing region, generally objects with different distances are not seen. In the lenses of such cameras, as are used for monitoring purposes, generally very many regions of the capturing region or of the scene are set to be sharp, since in video monitoring, the largest possible region of a scene should be detected. While no depth information can be gathered from the capturing region by way of varying the focus settings, this is possible with the proposed method.

Using the method proposed, it is furthermore increasingly possible in new applications of automatic video monitoring to use 3-D information of a scene to be monitored, for example in order to be able to detect and develop more robust VCA systems. Extraction and provision of such depth information would be very complicated and costly using other methods, in particular if for example the scene would have to be scanned by a camera in order to extract 3-D information (what is known as "structure from motion") in this way, or a use of 3-D sensors (for example Kinect, time-of-flight cameras, stereo cameras).

The proposed method can run in the background for example during normal operation, or if the camera is for example not being put to a different use.

The proposed method can also be used merely in a point-wise fashion in the scene in order to validate possible disturbance variables for the object tracking. Tracks, i.e. instances of tracking objects, can frequently be repeatedly interrupted or disappear in specific locations in the scene. With the proposed method, these regions can be measured in a targeted fashion for example to confirm obscuring edges, i.e. edges of objects behind which a person may be hidden.

By way of extracting such depth information, additional functions can be provided in the field of security technology, for example it is possible to answer the question whether objects are located in front of emergency exits or along paths leading to emergency exits. In addition, the question whether free view of the camera onto the scene is blocked by nearby obstacles can be answered.

The proposed method is additionally applicable to already installed cameras. For example, it may be offered as an additional service and thus provide added value for existing camera installations.

The partial regions on which the aim is directed are preferably selected taking into account image gradients in an image which corresponds to the at least one selected region. Such image gradients are understood to be for example gradients of brightness values of neighboring pixels. Since such gradients are particularly great especially for edges of objects which in turn also represent depth jumps, it is possible by taking into account image gradients to differentiate particularly well between objects, such that the partial regions can be selected in a targeted fashion so as to detect depth jumps.

The partial regions on which the aim is directed are preferably selected taking into account object tracking in at least one selected region. Here, it is possible to use for example video content analysis of the capturing region or of the at least one selected region, in which objects or, for example, persons can be tracked. The partial regions on which the aim is directed can in this way be limited to such regions in which people can actually be located, and therefore particularly good depth information is necessary for improved object tracking. Other regions which are not relevant for monitoring can thus be excluded very easily, as a result of which the depth map can be generated more quickly.

It is advantageous if the partial regions on which the aim is directed are selected such that neighboring partial regions at least partially overlap or join one another exactly, or as exactly as possible. In this way, easier stitching together of the individual depth images obtained from the respective partial regions is possible.

When generating the depth map, preferably individual depth images which correspond to the partial regions are stitched together, wherein depth information for regions of the at least one selected region for which no depth information was ascertained using the camera are estimated at least partially taking into account the depth information of the partial regions. In this way, depth information must be ascertained not for all the partial regions located in the relevant monitoring region, which is also frequently possible only with difficulty. In particular in the case of homogeneous surfaces, such as for example surfaces of objects, depth information can hardly be obtained through a variation of focus settings. These missing regions can then very easily be estimated for example by interpolation between depths which correspond to edges of an object.

Advantageously, by varying the focus setting of the camera, the depth information is ascertained from the respective partial region by recording images for different focus levels and by ascertaining from image gradients of the individual images a focus setting which corresponds to the maximum image gradient. Such image gradients can be understood to mean for example gradients of the brightness values of neighboring pixels. To this end, it is possible for example for in each case one image of the respective partial region to be recorded for different predetermined focus settings, as a result of which a series of images, which is known as an image stack, is obtained. Since the image gradient is greatest in the image which has the best focus setting, i.e. the image which is imaged the sharpest, it is possible by ascertaining the maximum image gradient to find the focus setting which corresponds to the distance of the object and which images the object sharply. It is possible to ascertain the distance of objects, i.e. the depth information, from the thus ascertained focus setting, for example using comparison values or a function as a result of which a focus setting is assigned a distance. This procedure, which is known per se, is also referred to as "depth from focus". Such comparison values or functions which are fitted to such comparison values can be ascertained for example by test recordings.

The accuracy of the depth information ascertained by varying the focus setting of the camera can for example be increased by using a suitable model of the focus, as is known for example from "Asada, N., Fujiwara, H. & Matsuyama, T. (1998). Edge and depth from focus. International Journal of Computer Vision, 26 (2), 153-163."

It is advantageous if the camera is aimed at the plurality of mutually different partial regions by panning and/or tilting and/or zooming the camera. To this end, a locationally fixed camera, in particular a PTZ camera, is expediently used as the camera. Panning, tilting and zooming are options for selecting different regions from the capturing region in the case of a locationally fixed camera. While different regions can be selected by panning in the horizontal direction, it is possible to select different regions in the vertical direction by way of tilting. Care must be taken that when changing the tilt angle, the capturable region changes in the horizontal extent. To this extent, it may be necessary for the aim to be directed to a different number of partial regions at different tilt angles in order to achieve the same resolution. Furthermore, it is possible to select a different image section by way of zooming. It may be practical here, in particular in the case of regions of the capturing region which are located far away, to use a high zoom level.

The depth map is preferably used for improving and/or checking a video content analysis for the at least one selected region. The depth map or the obtained depth information can be made available to a system for video content analysis (VCA system). Now for example improved or more robust object tracking, validation of erroneous detection by object detectors or for example generating a 3-D environment of the monitoring scene is now possible for visualization purposes. It is likewise conceivable to effect a calibration of the scene from the calculated depths, for example taking into account base planes and a height of the camera above these base planes. It is possible using the depth map to estimate extrinsic parameters of the camera, such as for example heights at which the camera is located and viewing angles onto the base plane.

A camera according to the invention, for example a PTZ camera, is in program-technological terms adapted to perform a method according to the invention.

A computing unit according to the invention, for example a control or evaluation unit for a camera, is, in particular in program-technological terms, adapted to perform the method according to the invention.

The implementation of the method in the form of a computer program is also advantageous, since it incurs particularly low costs, in particular if an executing controller is used for other tasks and is therefore already present. Suitable data carriers for providing the computer program are in particular magnetic, optical and electric memories, such as for example hard disks, flash memory, EEPROMs, DVDs and the like. Downloading a program by a computer network (Internet, intranet etc.) is also possible.

Further advantages and embodiments of the invention can be gathered from the description and the attached drawing.

The invention is schematically illustrated in the drawing on the basis of an exemplary embodiment and will be described below with reference to the drawing.

DETAILED DESCRIPTION

Figure 1:
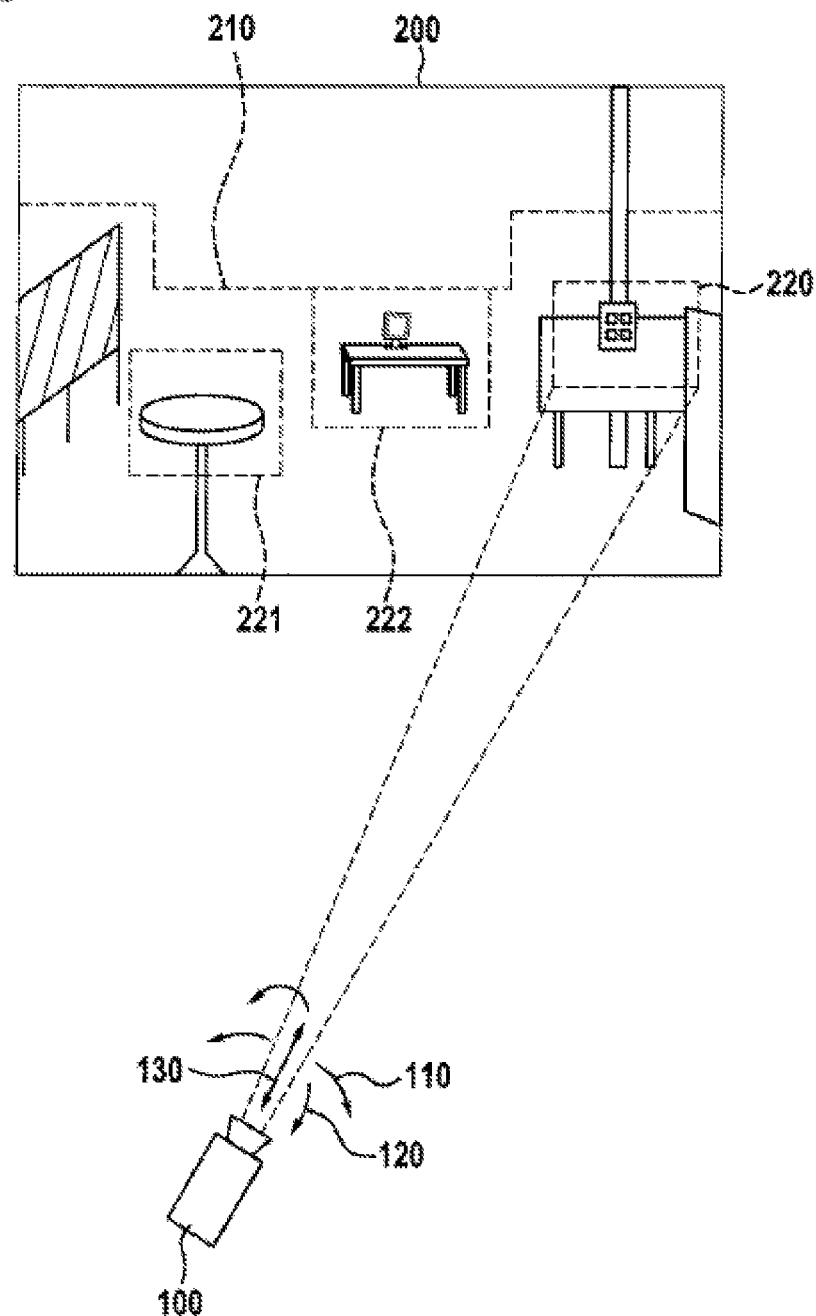
FIG. 1 schematically shows a camera, as can be used for a method according to the invention in a preferred embodiment, having an associated capturing region.

FIG. 1 schematically shows a camera 100, as can be used for a method according to the invention in a preferred embodiment. The camera 100 in the present case is what is known as a PTZ camera, i.e. a camera which, although mounted in a locationally fixed manner, can be panned and tilted and has zoom capability.

The associated movements are designated in the figure using the reference signs 110 for panning in the horizontal direction (i.e. rotation about the vertical axis), 120 for tilting in the vertical direction (i.e. rotation about a horizontal axis), and 130 for the zoom capability. While the camera 110 is rotated when panning and tilting are performed, the camera itself is not moved as part of the zoom function, but the setting of its lens is changed. In all three described possibilities, however, the region which is currently being captured by the camera can be changed.

A capturing region 200, in this case for example in an office space, is furthermore shown. The capturing region 200 here designates the maximum region of an environment that is capturable by the camera, i.e. by maximum panning, tilting and zooming. It is thus possible to effect monitoring in the capturing region 200.

In the capturing region 200, a region 210 is selected which comprises various objects located within the capturing region 200. In particular, the selected region 210 thus comprises regions in which for example people may be located or move. Regions in which people cannot be located, for example a ceiling region, are here not in the selected region 210.

In this case, three partial regions 220, 221 and 222 are shown by way of example in the selected region 210, which partial regions the camera 100 can be aimed at by suitable panning and/or tilting and/or zooming. Located in the partial region 220 is, for example, a high table, in the partial region 221 a desk, and in the partial region 222 a presentation board.

The partial regions can preferably be extracted along image gradients, since these represent possible depth jumps and covering edges represent an important variable in the video content analysis. Such image gradients are located in the example shown for example in the partial region 221 with the edges of the desk plate. Homogeneous surfaces in the image, for example the surface of the desk plate, can also be filled by way of post-processing, as a result of which the entire process for generating a depth map is accelerated.

It is likewise possible to determine on the basis of tracking results whether objects, such as for example people, move in the scene. In the example shown, it is also possible for the illustrated region 210 to be selected in this way, since people move for example in front of said objects.

This information can be used to estimate the depth of base planes at these locations, for example planes on which objects or people are located or move. Subsequently, the obtained values can be used to estimate a base plane, which in turn can be used as an input for tracking.

Panning the camera moves the image points of a captured image along circular paths, wherein the radius is dependent on the tilt angle of the camera. The greater the portion of the circular path that is visible in the image, the higher the number of recordings that should be made from this tilt angle in order to fill the total section, since the camera can be rotated only about two axes.

A simplified case is possible for example for a small tilt angle. In this case, the circular paths approximate straight lines, and the angle of the visible section corresponds approximately to the horizontal opening angle of the camera. It is then possible to effect a fixed division of the image into horizontal and vertical regions using the zoom factor and the opening angle.

Figure 2A:
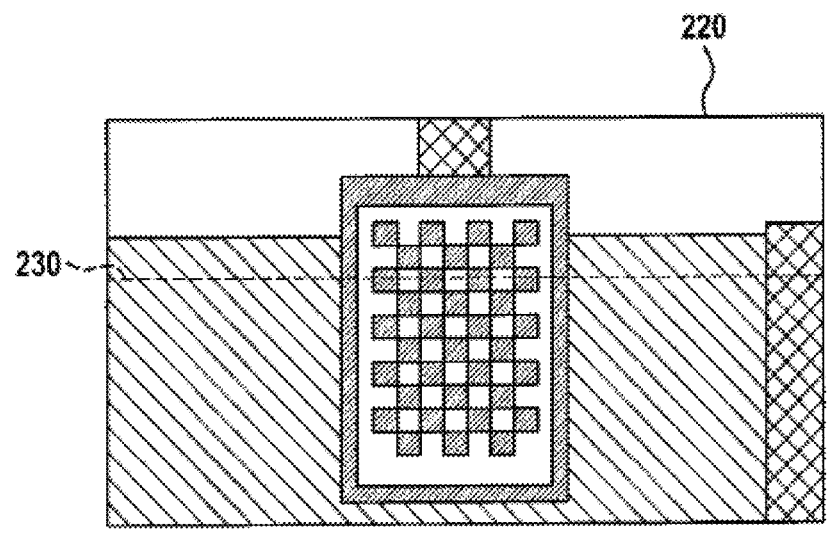
FIG. 2A schematically shows a partial region of the capturing region of FIG. 1.

FIG. 2A schematically illustrates in a more detailed fashion the partial region 220 of the capturing region 200 from FIG. 1. By way of example, it shows a board with a chessboard pattern.

Figure 2B:
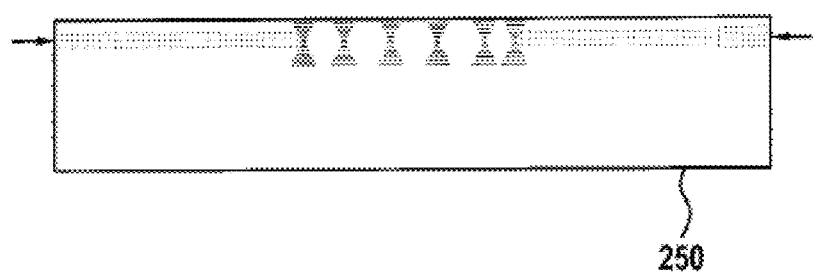
FIG. 2B schematically shows a gradient stack image for different focus settings of a camera for the partial region from FIG. 2A.

FIG. 2B now schematically shows a gradient stack image 250 for different focus settings (on the y-axis) of the camera 100 along a line 230 in the partial region 220 from FIG. 2A. The gradient stack image is produced from a multiplicity of images of the partial region 220 which were recorded using the camera 100 with respectively different focus settings of the camera 100.

For each of these images, the gradients can now be calculated, for example gradients in one neighborhood can be combined, if appropriate, or accumulation may be effected over a plurality of images to suppress noise. This is expedient in particular in dark image regions.

Each focus setting is assigned a y-value. For each focus setting, the brightness gradient is determined as the image gradient along a line 230 for each image point and for example plotted as a color or gray value. It should be pointed out that no gray levels can be depicted in FIG. 2B, and therefore illustratively black is shown for gray levels above a threshold, and white is shown for gray levels below the threshold. The actually brighter, longer lines of the "hourglass" are therefore also shown in black.

As can be seen from the image stack 250, the gradients are largest at the line which is marked on the left and right hand sides by way of an arrow, i.e. in this case the gradient is at a maximum. The focus setting corresponding to this image thus presents the partial region 210 as sharply as possible and can be used to ascertain the distance of the object, in this case the board having the chessboard pattern, from the camera.

Figure 3:
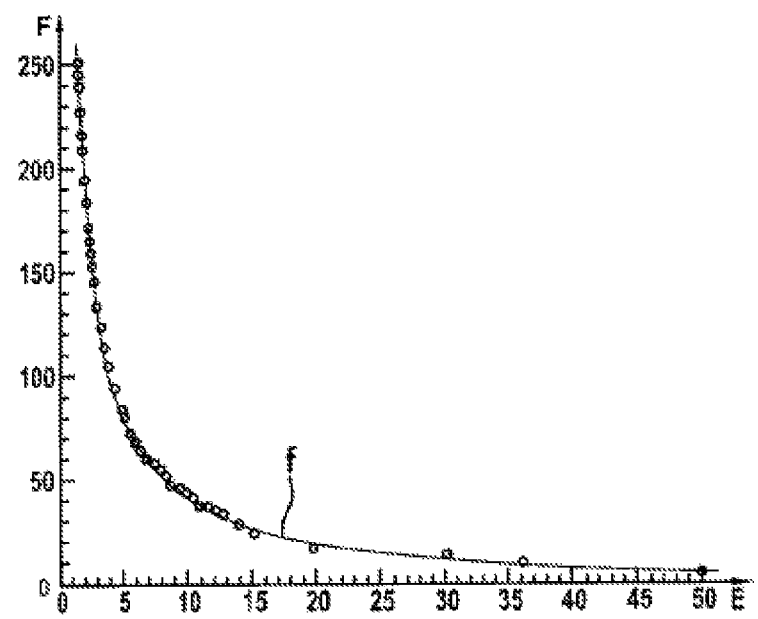
FIG. 3 shows a relationship between focus settings of a camera and distances of an object from the camera.

FIG. 3 shows in a diagram a relationship between the focus setting F of the camera and a distance E of an object from the camera. The distance E is given in meters, the focus setting F in an arbitrary unit.

The individual measurement points in the diagram (here illustrated as circles) can then be ascertained for example as part of test recordings. To this end, it is possible for example for an object to be positioned at various distances from the camera or its lens, and it is possible to select that focus setting with which the object is imaged as sharply as possible.

These individual measurement points can subsequently be fitted for example using a function f. In this way, it is possible very simply, using a method explained according to FIGS. 2a and 2b, for a distance to be assigned to an object. Such a method is also, as already mentioned, referred to as "depth from focus."

In this way, it is thus possible to assign a depth to the section illustrated in the partial region 220. In the same way, it is also possible for the remaining shown partial regions 221 and 222 to be assigned a depth.

Figure 4:
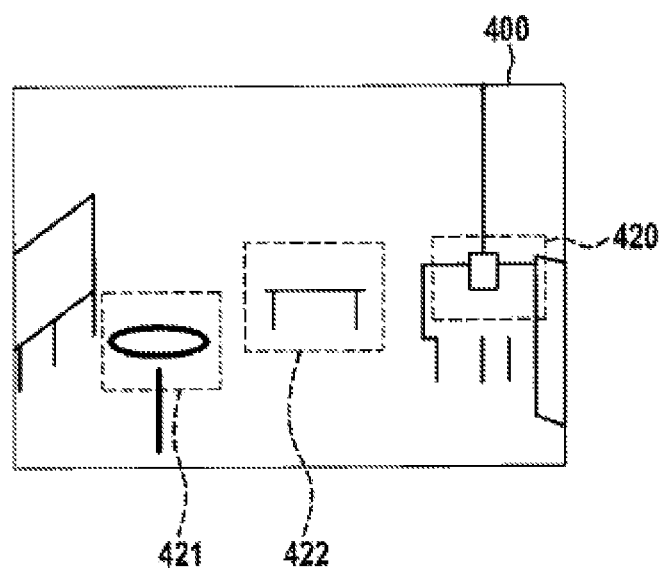
FIG. 4 schematically shows a depth map for the capturing region from FIG. 1.

FIG. 4 now schematically illustrates a depth map 400 for the capturing region 200 from FIG. 1. Here, the depth image 420 corresponds to the partial region 220, the depth image 421 to the partial region 221, and the depth image 422 to the partial region 222.

In the case shown here, objects having a smaller distance are illustrated with thicker lines, and objects having a greater distance with thinner lines. Objects having smaller distances can for example be illustrated in a gray level image as being brighter, and objects having a greater distance as being darker.

As can be seen in FIG. 4, it is sufficient for example to ascertain only the depths of edges of objects by varying the focus settings. Homogeneous surfaces, that is to say for example the plate of the high table in the partial region 221 or in the depth image 421, can be ascertained for example by interpolation of the depth of the edges that limit this surface.

Surfaces perpendicular to the camera normal have the same depth along circular paths, which is why it is practical to propagate values for the depth along circular paths. It is also possible in this way to ascertain the depth for specific surfaces or regions.

Stitching together individual partial regions or depth images should here be ensured so as to be able to extract a depth map of the entire scene or of the selected region of the scene. It is to be understood that to this effect, not only the three shown partial regions can be used, but as many partial regions as necessary to cover the entire selected region of the scene. As already mentioned, it may be practical here for neighboring partial regions to overlap.

Calculation of a concrete section of the depth map can be effected by perspective projection of all visible recordings in space onto the new image plane of the section, similar to what is done for example when rendering a computer graphic.

Also conceivable here is another measurement of potentially defective regions in the depth map. Likewise conceivable is that the scene is validated from time to time to check whether the 3-D structure has changed.

An existing functionality of the VCA system can then be improved with the proposed method, for example what is known as the function "idle object detection" can be plausibilized. Here, a PTZ camera would be aimed at the location of the relevant object and attempt to identify depth differences in this region and thus to plausibilize whether this is an object or whether a shadow can be seen, for example, which has triggered for example a wrong warning.

Then depth maps can be obtained for example by regions of unknown depth, which are for example a result of a low signal-to-noise ratio in this region and for which the "depth from focus" method has failed, being filled by post-processing.

The invention claimed is:

1. A method for generating a depth map of at least one selected regions of a capturing region of a camera, the method comprising:
aiming the camera at each individual partial region of a plurality of mutually different partial regions of the at least one selected region by adjusting a pan or tilt of the camera,
ascertaining, for each of the partial regions, a depth information item ascertained for the respective partial region by varying a focus setting of the camera while the camera is aimed at the respective partial region,
generating a depth map taking into account the depth information of the partial regions, and
selecting the partial regions on which the aim is directed based at least in part on image gradients in an image which corresponds to the at least one selected region.

2. The method according to claim 1, further comprising selecting wherein the partial regions on which the aim is directed based at least in part on object tracking in the at least one selected region.

3. The method according to claim 1, wherein the partial regions on which the aim is directed are selected such that neighboring partial regions at least partially overlap.

4. The method according to claim 1, wherein generating the depth map includes stitching together individual depth images which correspond to the partial regions, and wherein depth information for regions of the at least one selected region for which no depth information is ascertained using the camera is estimated at least partially taking into account the depth information of the partial regions.

5. The method according to claim 1, wherein the depth information is ascertained from the respective partial region using variation of the focus setting of the camera by recording images for various focal stages, and a focus setting corresponding to the maximum image gradient is ascertained from image gradients of the individual images.

6. The method according to claim 1, wherein the aiming the camera at the plurality of mutually different partial regions includes adjusting a pan, tilt, and zoom setting of the camera.

7. The method according to claim 1, wherein a locationally fixed camera, is used as the camera.

8. The method according to claim 1, wherein the depth map is used in video content analysis for the at least one selected region.

9. A computer configured to:
aim a camera at each individual partial region of a plurality of mutually different partial regions of the at least one selected region by adjusting a pan or tilt of the camera,
ascertain, for each of the partial regions, a depth information item ascertained for the respective partial region by varying a focus setting of the camera while the camera is aimed at the respective partial region,
generate a depth map taking into account the depth information of the partial regions, and
select the partial regions on which the aim is directed based at least in part on image gradients in an image which corresponds to the at least one selected region.

10. A non-transitory, machine-readable storage medium having a computer program according that when executed by a computer causes the computer to:
aim a camera at each individual partial region of a plurality of mutually different partial regions of the at least one selected region by adjusting a pan or tilt of the camera,
ascertain, for each of the partial regions, a depth information item ascertained for the respective partial region by varying a focus setting of the camera while the camera is aimed at the respective partial region,
generate a depth map taking into account the depth information of the partial regions, and
select the partial regions on which the aim is directed based at least in part on image gradients in an image which corresponds to the at least one selected region.

* * * * *